US011468472B2

(12) United States Patent
Zoldi et al.

(10) Patent No.: US 11,468,472 B2
(45) Date of Patent: Oct. 11, 2022

(54) SYSTEMS AND METHODS FOR SCALABLE, ADAPTIVE, REAL-TIME PERSONALIZED OFFERS GENERATION

(71) Applicant: FAIR ISAAC CORPORATION, Roseville, MN (US)

(72) Inventors: Scott Michael Zoldi, San Diego, CA (US); Amit Kiran Sowani, Bangalore (IN); Ujjwal Kumar, Seraikella-Kharsawan (IN); Sidakpreet Singh Chawla, Jalandhar (IN)

(73) Assignee: FAIR ISAAC CORPORATION, Roseville, MN (US)

( * ) Notice: Subject to any disclaimer, the term of this patent is extended or adjusted under 35 U.S.C. 154(b) by 657 days.

(21) Appl. No.: 15/442,434

(22) Filed: Feb. 24, 2017

(65) Prior Publication Data

US 2018/0197200 A1 Jul. 12, 2018

(30) Foreign Application Priority Data

Jan. 12, 2017 (IN) .............................. 201711001299

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
CPC ................................................. G06Q 30/0269
See application file for complete search history.

(56) References Cited

U.S. PATENT DOCUMENTS

| 6,330,546 | B1 | 12/2001 | Gopinathan et al. | |
| 8,090,648 | B2 | 1/2012 | Zoldi et al. | |
| 2010/0049538 | A1 | 2/2010 | Frazer et al. | |
| 2014/0310159 | A1* | 10/2014 | Zoldi | G06Q 30/02 705/39 |
| 2015/0046216 | A1* | 2/2015 | Adjaoute | G06Q 20/4016 705/7.29 |

* cited by examiner

*Primary Examiner* — John Van Bramer
(74) *Attorney, Agent, or Firm* — Mintz Levin Cohn Ferris Glovsky and Popeo, P.C.

(57) ABSTRACT

A system and method for scalable, adaptive, real-time generation of personalized offers is disclosed. A profile of a user is generated, the profile being a summarized representation of historical behavior of the user, the profile containing recursively updated variables. The profile is updated for each new transaction and/or a time dependent event, the new transaction and/or time dependent event including purchase transaction data, user, item hierarchy, and offer data. A affinity scores is generated for the user based on the updated profile, and for each new transaction, one or more offers are generated for the user based on the updated user profile and the affinity scores.

11 Claims, 11 Drawing Sheets

Frequency Table

| Index | Item | Quantity |
|---|---|---|
| 1 | 77 | F1=3.2 |
| 2 | 318 | F2=9.2 |
| 3 | 291 | F3=0.3 |
| 4 | 54 | F4=2.7 |

Items 318 and 77 are favorites to begin with

Ranking table

| Rank | Index |
|---|---|
| 1 | 2 |
| 2 | 1 |
| 3 | 4 |
| 4 | 3 |

Transaction for item 54 & 68

| Index | Item | Quantity |
|---|---|---|
| 1 | 77 | F1*β = 2.5 |
| 2 | 318 | F2*β = 7.3 |
| 3 | 291 | F3*β = 0.2 |
| 4 | 54 | F4*β+λ = 4.1 |
| 5 | 68 | α = 1.0 |

| Rank | Index |
|---|---|
| 1 | 2 |
| 2 | 4 |
| 3 | 1 |
| 4 | 5 |

Items 318 and 54 are the favorites after update

SYSTEMS AND METHODS FOR SCALABLE, ADAPTIVE, REAL-TIME PERSONALIZED OFFERS GENERATION

TECHNICAL FIELD

The subject matter described herein relates to computer-implemented marketing, and more particularly to systems and methods for scalable, adaptive and real-time personalized offers generation.

BACKGROUND

Offers are marketing instruments that provide price discounts on items. Retailers and manufacturers distribute offers to users for a variety of reasons, including, but not limited to: price sensitivity testing, demand generation, increasing or retaining sales, increasing or retaining store traffic, encouraging new item trial, triggering brand switching, enhancing loyalty, and for encouraging loyalty program membership sign up and renewal.

Offers are often widely and rather indiscriminately distributed via direct mail, in-pack, on-pack, handouts, magazines, free standing inserts, newspapers, or the internet. Increasingly, data-driven retailers and online merchants seek to leverage massive sales and marketing databases to target offers more strategically to specific markets, specific user segments, and using increasingly personalized execution channels, down to the individual users. Furthermore real time offers implying offers generated immediately after the most recent purchase transaction are also an emerging and are an important requirement of modern day retailers. The offers are also increasingly given out more frequently, and delivered electronically via email, SMS, to mobiles, and tablets. All of this is aimed to sharpen the offers relevance for the recipients, and with it the desired impact on the business. Ill-designed offer campaigns also carry their risks, most notably, revenues and margins erosion, upping the ante for offer strategy development and optimization.

A logical sub-problem of personalized offer targeting is then, which users to target with what offers (if any) and when, in order to optimize a given business objective? The context and timing of the offer is also very important as it governs whether the user is likely to respond to it. For example an offer loses its relevance if the user has already bought the item recently. Targeted offers in retail today are largely the result of batch processes. The offers a consumer receives at a kiosk do not take into account items just purchased. This problem can be addressed by real-time availability of shopping cart information, and with automated modeling and rapid scoring of purchase behavior, and use that to offer items and promotions in real time. Analytic building blocks of typical approaches would include effective user segmentation schemes, predictive modeling and scoring tools, combined with using insights into individual user preferences.

As one example of predictive models, some retailers employ offer models that offer to those individuals who are most likely to redeem the offers. These models maximize probability of offer redemption using widely known techniques such as logistic regression. Targeting users with high redemption likelihoods is the optimal strategy if the goal is to maximize offer redemption, and some retailers consider this as a reasonable strategy to deepen loyalty with their users. Other types of predictive models in use consist of purchase propensity scores. These scores predict for each user his/her propensity to purchase any given item at any given point in time. These propensity scores are used to decide which offers to give to whom and when. Using point of sale transaction data, a large number of propensity scores for items across users are computed using the system described in the U.S. Patent Publication No. US2010/0049538, the contents of which are incorporated by reference herein in their entirety for all purposes.

Purchase propensity models, while being reasonably accurate in predicting likelihood of purchase in a near time horizon, need regular update and deployment of models through human intervention. Further, these models are built at coarse granularity of subcategory (e.g. Toothpaste) and category (e.g. Oral Care) levels, numbering in a few thousands, and not scalable for making predictions at more granular level or Stock Keeping Unit (SKU) level (e.g. Colgate Total Mint Gel), which are numbered in several thousands. The granular predictions help in accounting for user's affinities to specific item attributes such as category, brand, size, price, etc. The model needs to predict likelihood of purchase at a granular level such as at SKU level, score in real time and update its parameters in-situ on a frequent basis without human intervention. The real time scoring capability allows for the presentation of highly relevant offers to the user based on his/her most recent context.

The extant purchase propensity models are typically supervised classifier models which are based on discrete time hazard models. The discretization of time is usually in units like months, weeks or days. As the time discretization becomes more granular it increases the individual users profile data sizes as well as the profile variable computation and scoring times. This limits the capability of the models to provide real time offers. The profiles also typically involve iterative aggregation of the transaction history which is not efficient from the perspective of the memory required to save the profiles or for the computation time.

The models should also ideally be self-learning which is an aspect geared towards accounting for rapidly changing behavior patterns without need for expensive and frequent model updates. The models should need to be trained for the first time at on-boarding and periodically updated in a pre-decided cadence. The adaptive features of the models enable the solution to be deployed in the retailer's production environment. The systems and methods described herein provide a scalable, adaptive, real-time system to generate personalized offers.

SUMMARY

This document describes systems and methods for scalable, adaptive, and real-time personalized offers generation. The systems and methods include an automated system for providing propensity scores with low latencies and at scale. It is a highly scalable system which consumes the retailer's purchase transaction data, user demographic information, item hierarchy, and offer data and provides relevant offers for each user. It processes a user's current transaction and updates an existing user profile with low latencies. A profile is a summarized representation of the user's historical behavior. A recursively updated user profile is maintained, and contains recursively updated variables instead of bins of counts of purchases or more transaction storage, these profiles are updated each time a new transaction occurs and/or a time dependent event occurs. The user profile eliminates the need to store and access potentially numerous historical transactions and the costs and overhead associated with doing that. The updated user profile is scored with a suite of available models, and scores are generated for all or a subset of all items for the user.

In order to meet the real time requirement, the system uses the real time profile update and scoring steps. The system can score using multiple models which leverage different machine learning techniques and address different use cases. To enable real time scoring, the system applies a dimensionality reduction algorithm to reduce the number of applicable items to score. Furthermore the scores generated from this system are subjected to a list of business constraints such as number and size of available offers, user or item/SKU suppressions, etc. to ensure business objectives of the retailer are accounted for in the final sets of generated offers.

A system and method as described herein integrates input user purchase transactions, with a combination of patented profiling technology (including as described in U.S. Pat. No. 6,330,546, the contents of which are incorporated herein in their entirety for all purposes) and advanced machine learning to generate item offers in real time. The objective of the system and proposed methods are to maximize user loyalty via offer relevance through a real time offer generation product suite.

In certain aspects, a method, computer program product, and system are disclosed. The computer program product and system execute a method that includes generating a profile of a user, the profile being a summarized representation of historical behavior of the user, the profile containing recursively updated variables. The method further includes updating the profile for each new transaction and/or a time dependent event, the new transaction and/or time dependent event including purchase transaction data, user, item hierarchy, and offer data. The method further includes generating a propensity score for the user based on the updated profile. The method further includes, for each new transaction, generating one or more offers for the user based on the updated user profile and the propensity score.

Implementations of the current subject matter can include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
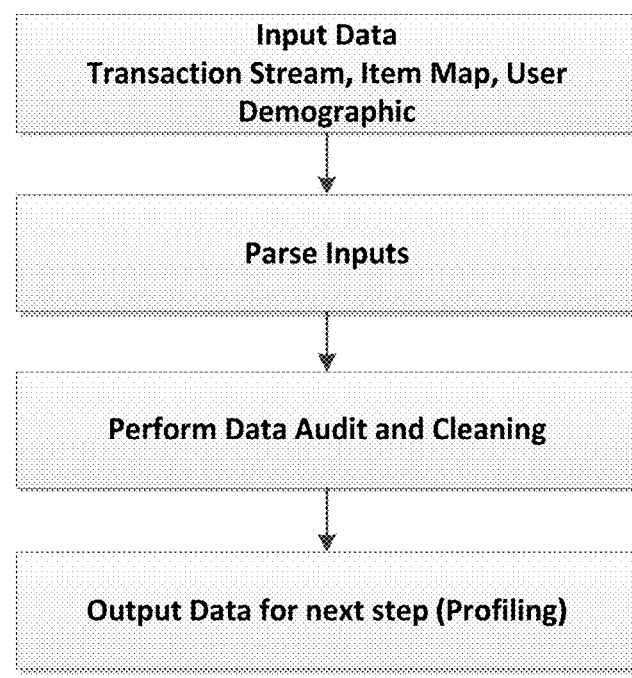
FIG. 1 is a flowchart illustrating a method for cleaning the input data and parsing into the appropriate format.

The systems and methods described herein process input user data, with a combination of patented profiling and scoring technologies and advanced machine learning techniques to generate item offers in real time. The system is able to achieve high throughput (defined as transactions per second) and low model scoring latency of the order of milliseconds through profiling technology, behavior sorted lists, and item propensity models. The proposed system has real time profile update and scoring capabilities. The system can score and compare multiple models deployed in field and select the best model/algorithm for each user context. The models are predictive and provide meaningful personalized offers to the users. The models can also predict at a granular SKU level thereby increasing the level of user personalization which is particularly important in today's marketing applications. Models are also fast to train and are self-adaptive through minimal modeler inputs, thereby having an automated system.

Typical retailers could offer thousands of unique items to millions of users which would result in billions of lines of transaction information. Real-time offers require the ability to process this data in a fraction of a second and produce relevant offers based on an underlying model. The size and behavior driven complexity calls for a packaged streaming analytics system and highly automated system that scales to a large number of users and offers. Moreover, for real time decisioning, it is also necessary to transform the model based predictions into actions, which are individualized offer assignments.

In accordance with some implementations, an automated system for providing propensity scores with low latencies and at scale is provided. The system is highly scalable and consumes the retailer's purchase transaction data, user demographic data, item hierarchy, and offer data and provides relevant offers for each user. The system processes a user's current transaction and updates an existing user profile with low latencies. A profile is a summarized representation of the user's historical behavior. A recursively updated user profile is maintained, driven by the requirements of efficiency and conciseness. The profile is dynamic and contains recursively updated variables instead of bins of counts of purchases or more transaction storage, these profiles are updated each time a new transaction occurs and/or a time dependent event occurs. The user profile eliminates the need to store and access potentially numerous historical transactions and the costs and overhead associated with doing that. The updated user profile is scored with a suite of available models, and scores are generated for all or a subset of all items for the user.

In order to meet the real time requirement, the system uses the real time profile update and scoring steps. The system can score using multiple models which leverage different machine learning techniques and address different use cases. To enable real time scoring, the system applies a dimensionality reduction algorithm to reduce the number of applicable items to score. Furthermore the scores generated from this system are subjected to a list of business constraints such as number and size of available offers, user or item/SKU suppressions, etc. to ensure business objectives of the retailer are accounted for in the final sets of generated offers.

The systems and methods integrate input user purchase transactions, with a combination of profiling technology, such as described in U.S. Pat. No. 6,330,546, the contents of which are incorporated by reference herein for all purposes, and advanced machine learning to generate item offers in real time. The objective of the system and proposed methods are to maximize user loyalty via offer relevance through a real time offer generation product suite.

Input Data

The system inputs a time series of retail user purchase transactions and other data including but not limited to user demographic data, loyalty membership data, store data, and available offer data. The input data can also comprise an item dictionary which maps the SKU level information to higher levels of the item hierarchy such as a sub-category, category, brand etc. The system can also employ other data sources such as click-stream data from online sessions, user item ratings, etc. It can also employ historical time series data on different types of marketing activities, previous offers, and previous redemptions.

Examples of transaction data, item hierarchy data, and user demographic data are described in TABLE 1 below.
Example of raw transaction data with 1 row per transaction:

| User  | SKU | Date          | $ Unit Price | Quantity | $ Amount |
|-------|-----|---------------|--------------|----------|----------|
| user1 | 123 | Mar. 28, 2016 | 3            | 3        | 9        |
| user2 | 456 | Apr. 15, 2016 | 1            | 4        | 4        |
| user3 | 789 | Apr. 16, 2016 | 2            | 3        | 6        |

Example of a retailer's item hierarchy:

| SKU | Sub Category | Category | Sub Department | Department |
|---|---|---|---|---|
| HEINZ VINEGAR WHITE | White | Vinegars/Cooking Wine | Salad Fixings | Grocery |
| COLGATE TOTAL MINT GEL | Toothpaste | Oral Care | Skin & Oral Care | Beauty Products |
| LAYS CHIPS CLASSIC | Potato Chips | Salty Snacks | Snacks | Grocery |
| AVOCADO | Avocado | Tropical Fruit | Fruit | Produce |

Example of user demographic data:

| User | Gender | Age | Region | Tenure (years) | Segment | ... |
|---|---|---|---|---|---|---|
| user1 | F | 32 | San Diego | 4 | Secure Family | ... |
| user2 | M | 35 | San Jose | 2 | Wealthy Executive | ... |
| user3 | F | 26 | Los Angeles | 1 | Educated Urban | ... |

FIG. 1 is a flowchart of a method 100 for receiving inputs prior to profile generation. At 102, input data, which includes a transaction stream, item map, user demographics, etc., or the like, is received by a computer processor. At 104, all of the inputs are parsed, and at 106 the input data is cleaned, and prepared to be used in user profiling exercise which is described next. At 108, the input data is output for a profiling process.

Profiles

It is extremely inefficient to store the user's transaction information in the raw format due to the large volume of data. It is also time consuming to aggregate this information in real time to generate variables which are used in the models. The computational latency will be very high. To reduce the memory utilization and stream line the profile creation/update for low latency computation, the user's data is represented as a set of relevant recursively updated variables in the user profile, thus capturing the transaction history in an efficient and concise manner in a set of features.

Figure 2:
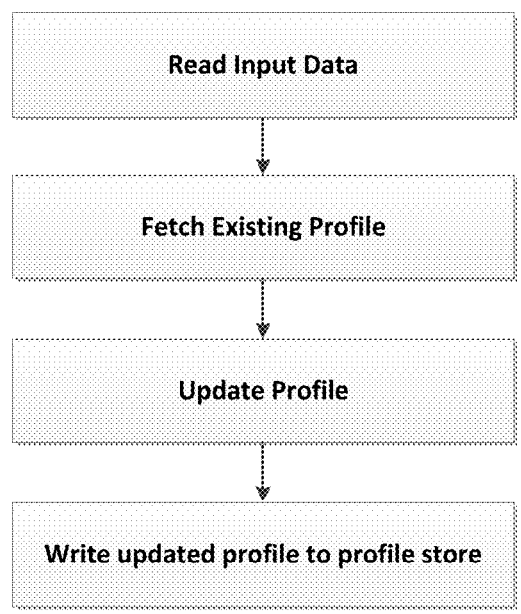
FIG. 2 is a flowchart illustrating a method of profile creation and subsequent update.

FIG. 2 illustrates a method 200 for profile creation and subsequent update. At 202, input data (the output data from method 100 in FIG. 1) is received by the computer processor. At 204, an existing profile is fetched by the computer processor. At 206, the computer processor updates the profile, as described in further detail below. At 208, the computer processor writes the profile to a profile store of the system, also further described in detail below.

Figure 3:
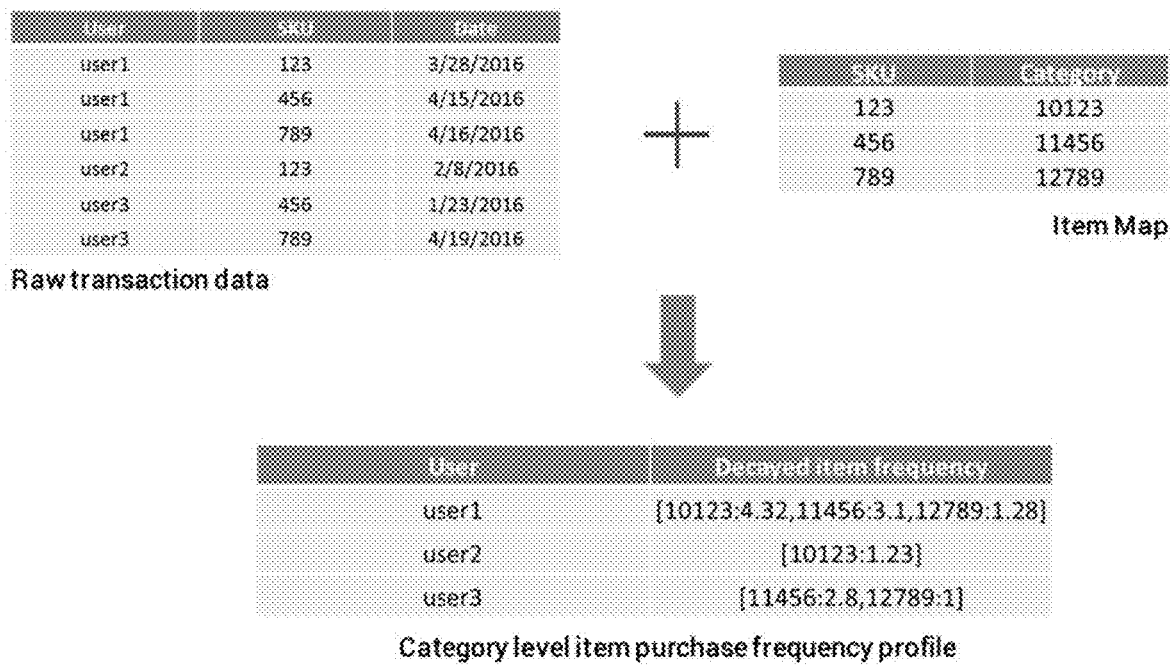
FIG. 3 illustrates an example of a profile creation based on input transaction data where a user's purchase history is captured by a decayed frequency metric after mapping it to product category level.

The recursive profile allows the user's state to be concisely summarized in terms of the current state of all predictive features and thus enabling rapid decisioning. The dynamic profiling technology mathematically compresses large amounts of historical transactional data to facilitate real-time transactional analytics. The user profile contains a variety of variables such as the frequency of purchase of an SKU by the user, time elapsed since last purchase, quantity purchased, price paid, and recursively updated variables such as the ratio of a SKU's purchase in the recent past as compared to more distant past. Recursive variables represent the transaction history concisely using velocities, averages, and ratios of purchase variables. The system computes the updated value of the variable solely using information related to the current transaction and the time since the last transaction without any reference to any other historical information. The variable can be regarded as weighted averages of certain characteristics that get updated by each transaction recursively. Since variables are recursively updated with incremental transactions, they eliminate the overhead associated with storing and accessing large volumes of historical transactions and makes real time scoring possible. FIG. 3 illustrates an example of a profile creation based on input transaction data where a user's purchase history is captured by a decayed frequency metric.

The recursive variable computation is next described. For an input stream of user transactions, $\upsilon_1, \ldots, \upsilon_m$ the recursive variable is computed as the weighted average of this stream of data. This computation is performed using a recursive formula to calculate the profile variable, $x_m$. The recursive formula is of the form:

$$x_m = a_m \upsilon_m + (1-a_m)x_{m-1}$$

for some $a_m$, where
$x_{m-1}$ is the previous profile variable
$x_m$ is the updated profile variable
$\upsilon_m$ is the quantity of the current transaction Therefore the formula is a weighted average of past and current, in which the weight given to the older events gets larger over time. The profiling system can compute exponential approximation based on time or event. Different time and event exponential formulas and other functions can be used to get at time-averages, event averages, or other type of recursive formulas. The above scheme results in an always up to date recursively updated profile of the user taking into account the most recent transaction and history of transactions.

Next, an example of recursive variable generation using purchase transactions is described in FIG. 3. The raw data in this example consists of user ID, SKU purchased, and the date. The generated profile includes SKU ID along with a summarized recursive value of all historical purchases of the SKU. These recursive lists allow a reduction in the features monitored and handle the natural sparseness of user purchasing behavior. The SKU level transaction information can be mapped to higher levels of the item hierarchy using item hierarchy mapping and the profiles can be summarized at the higher level of item.

User transactions can be extremely voluminous and purchase patterns usually follow a long-tailed distribution (i.e. infrequently occurring) with respect to the variety of purchased items. Our system uses profiling techniques which restrict the size of the profiles generated by summarizing the historical information in a concise manner. One such technique is the Behavior Sorted Lists (BLISTs, for short) technology, described in U.S. Pat. No. 8,090,648. Empirically, this method is found to be useful for tracking frequently occurring behaviors and entities in the transactions as well as isolating unusual behavior. These lists maintain the majority of the transaction history variables while isolating rare events as not predictive to propensity. The rare events when identified using the BLIST technology can be maintained in other Behavior lists of rare events which can be especially useful for cross-sell, these nested BLISTs isolate the common transactions from those that are rare as both propensity and cross sell are driven by different frequency of events.

The BLIST Behavior Sorted Lists technology dynamically tracks and updates each user's frequent purchase patterns in a sorted entity and a frequency table. The profiling is extended and tracked for each purchase pattern, typically based on categorical entities. Given that these patterns can be utilized across the various item hierarchies, the description is continued here generically as recurrences of numbers, the reader understands these could be item, item sub-categories, item categories, etc. The BLIST is updated for each transaction allowing for a pattern of favorite items to evolve over time. Recurring transactions help establish purchase behavior patterns. It is noteworthy that ranking table is kept fixed in size, and membership and ranking keeps changing over time as new transactions are taken into account and the users' favorite purchased items change in frequency and recency.

The BLIST utilizes the following two tables, stored in a user profile: a table of pseudo-frequencies of the corresponding 'n' most frequent items (Frequency table); and a table of ranking for these items (Ranking table).

Figure 4:
FIG. 4 shows an example of Behavior Sorted Lists (BLISTs) used in profiling.

These tables are collectively referred to as the BLIST in the following description. It should be noted that the "frequencies" stored in the frequency table are not true "frequencies" but are pseudo-frequencies that approximate or estimate the true frequencies and apply over a decayed time or event window. The Frequency Table and Ranking Table are coupled via common indices. An example of a recursive frequency BLIST is shown in FIG. 4.

From the above Number Table and Frequency Table, the frequency for item "77" (with index 1 in the Number Table) is 3.2. The frequency for number "318" (with index 2 in the Number table) has a frequency of 9.2. The frequency for number "54" (with index 4) has a frequency of 2.7, and frequency for number "291" (with index 3) has a frequency of 0.3. The ranking table stores the common indices of number table and frequency table in the decreasing order of the frequency. For example, referring to the Ranking table, index 2 in the number table (corresponding to number "318") has the highest frequency (9.2), index 1 (corresponding to the number "77") the second-highest frequency (3.2), and so on.

Upon each new item data received for a consumer the respective Number table is looked up to determine whether it is frequently occurring for that user utilizing the rank of the number from the Ranking table. Once the lookup is complete, the tables are updated as follows:

All the frequencies in the Frequency table are decayed by a multiplicative factor, $\beta$, where $0<\beta<1$.

Then, Number table and Frequency table are updated as follows: If the current number is not in the Frequency table, then least-frequent number (determined by the Ranking table) is replaced with the current number if the least frequent number's frequency (based on the Frequency table) is less than a threshold $\delta$, where $$0 < \delta < \frac{1}{1-\beta}.$$

Other techniques to determine the threshold $\delta$ can be used, including use of adaptive thresholds based on match rates and recycling rates associated with the Number table. The frequency of the current number is initialized to be $\alpha$. If the current number is already in the Number table, then its frequency is increased by $\lambda$. Finally, the Ranking table is updated accordingly to reflect any changes to the ranking of numbers in the Number Table based on the update.

The "frequencies" in the frequency table are not true frequencies but based on a ranking associated with the values of $\alpha$, $\beta$ and $\lambda$, which are dependent on application and can vary based on the type of item data descriptions being monitored in the Frequency table.

Profiles enable models to utilize intricate nonlinear relationships between many pieces of data in a fraction of a second based on the incremental and streaming implementation in which complex patterns are iteratively updated. The profiles are stored in a persistent data store such as Couchbase® for high performance storage of profiles. The system could optionally also use other relational databases as well as NoSQL databases such as Cassandra, HBase, etc.

Couchbase® is a NoSQL document database which has a flexible data model, is easily scalable, provides consistent high performance and has redundancy. It allows for the storage of data as key-value pairs or JSON documents which support nested structures, as well as fields representing relationships between items. NoSQL databases are characterized by their ability to store data without first requiring one to define a database schema. Application objects can be changed without having to migrate the database schema, or having to plan for application downtime. NoSQL databases also provide the ability to scale the application, both within a cluster of servers and between clusters of servers. Additional instances of the database can be added to address growth in application data without any interruptions or changes in the application code. They can be designed for massively concurrent data use and consistent high throughput. They can also spread workload across servers to maintain consistent performance and reduce bottlenecks at any given server in a cluster. Furthermore features such as cross-data center replication and auto-failover help ensure availability of data during server or datacenter failure. All of these features of NoSQL databases enable development of web applications where low-latency and high throughput are required.

Models

While the profiles summarize the input data, the models utilize the user profiles to predict the future purchase probabilities of a given item. Many types of marketing models can be constructed around this profile paradigm. Repeat purchase models identify the items which the user is most likely to buy again from amongst the items which he/she already purchases. This contrasts with cross-sell models which predict the most preferred or likely items for the user amongst those which are not regularly purchased by the user. The cross-sell predictive model constructs a set of aligned but infrequently bought items for the user and those items are then offered to the user with the objective of promoting cross-sales. The system utilizes a suite of models to predict repeat purchase items and cross-sell items.

The training data for modeling is extracted from the profile data store itself. The extracted dataset contains a snapshot of the profile dataset at the time of extraction and the current transaction. Predictive variables can be generated, specific to each type of model and often these variables are predefined directly in the profile. Optionally a target variable can be generated for supervised modeling techniques.

Figure 5:
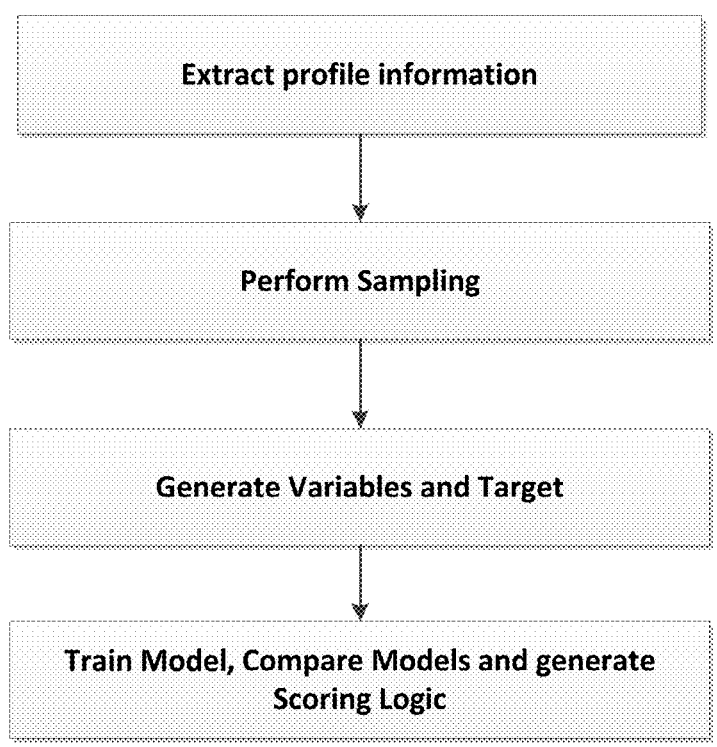
FIG. 5 is a flowchart illustrating a method for model development.

FIG. 5 is a flowchart illustrating a method 500 for model development. At 502, one or more computer processors extract profile information, and at 504, the one or more computer processors sample the extracted profile information. At 506, the one or more computer processors generate variables and target information related to commercial transactions of a user associated with the profile information. At 508, the one or more computer processors train a model, compare models, and generate scoring logic for generating a score. The method 500 is described in further detail below.

The modeling design is to some extent governed by the scoring needs and constraints. The ability to score in real time dictates the type of models which can be integrated within the system. The model representation also needs to be adapted to enable real time scoring. Therefore the model development must replicate the scoring environment. The exact same profiles which are created for scoring are also created for the modeling. The profiles for modeling are extracted from a system that provides the variables in exactly the same form as they will be for production scoring. Variables in the model which are calculated directly or derived from the base profile are also computed within the scoring system. The model does not use any inputs which are not included in the scoring system. The system allows for the extraction of the current snapshot of a user, which is then sampled and used for modeling.

Figure 6:
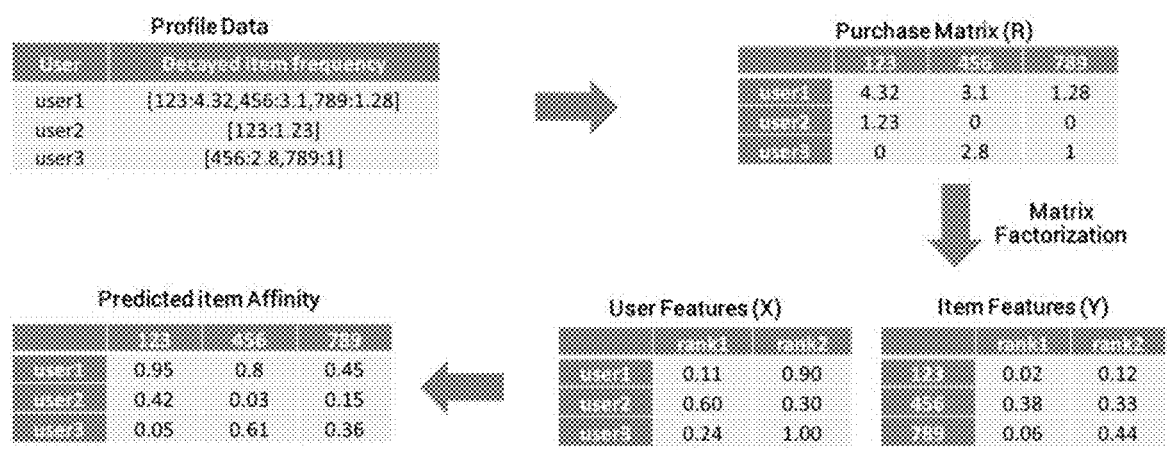
FIG. 6 depicts a latent factor model.

Depending on the business application the system is capable of training one or more of the latent factor models, topic models and neighborhood models. The system implements latent factor models including nonnegative matrix factorization using alternating least squares (ALS) and stochastic gradient descent (SGD), principal component analysis (PCA), Karhunen-Loève decomposition (KLD) and singular value decomposition (SVD). These models use low rank matrix factorization techniques to decompose the user activity matrix into user and item factors. An example of latent factor model is depicted in FIG. 6

In one implementation of latent factor models, an Alternating Least Squares (ALS) algorithm is used. In this implementation, the user purchase matrix, R is created based on the user profile data.

$$R_{ui} = \begin{cases} r_{ui} & \text{if user, } u \text{ purchased item, } i \\ 0 & \text{if user, } u \text{ did not purchased item, } i \end{cases}$$

$r_{ui}$—The quantity or volume or amount of purchase of item i by user, u

The purchase matrix, R is factorized into a user feature matrix X and an item feature matrix Y.

$$R = XY^T$$

The user and item feature matrices are optimized by minimizing a least squares cost function, J.

$$J = \sum_{u,i} (r_{ui} - x_u^T y_i)^2 + \lambda \left( \sum_u \|x_u\|^2 + \sum_i \|y_i\|^2 \right)$$

$x_u$—The $u^{th}$ row from the user feature matrix X
$y_i$—The $i^{th}$ row from the item feature matrix Y
$\lambda$—Regularization parameter The cost function is optimized by alternating between the user and item features. It first estimates the item features, Y using the user features, X and then estimates the user features, X by using the item features, Y, alternating back and forth until the user features, X and the item features, Y converge. The regularization terms are used in order to avoid overfitting the data.

To address implicit feedback data, like item purchases, the approach has the option of modeling the matrix of purchase values and treats the data as a combination of binary preferences and confidence values (Hu, Park, Koren, and Volinsky 2008). The purchase values are then related to the level of confidence in observed user preferences, rather than explicit ratings given to items.

The user purchase matrix, P is created based on the user profile data.

$$P_{ui} = \begin{cases} 1 & \text{if user, } u \text{ purchased item, } i \\ 0 & \text{if user, } u \text{ did not purchased item, } i \end{cases}$$

The binarized purchase matrix, P is factorized into a user feature matrix, X and an item feature matrix, Y.

$$P = XY^T$$

The user and item feature matrices are optimized by minimizing a least square cost function, J, which incorporates a confidence term, a which signifies the confidence in the original purchase value.

$$\sum_{u,i} (1 + \alpha r_{ui}) \cdot (p_{ui} - x_u^T y_i)^2 + \lambda \left( \sum_u \|x_u\|^2 + \sum_i \|y_i\|^2 \right)$$

In latent factor models, the model representation is adapted to enable the folding-in of new transactions and users for real time scoring. The standard representation of the model consists of user and item features. However taking the inner product of these would not allow to account for the transactions taking place in real time after the model has been trained. To account for a purchase by a new user or a new purchase by an existing user the new purchase is projected back into the user item space via fold-in. The model representation is updated accordingly based on linear algebraic modification of the original representation.

As time progresses, a user's buying preferences change and in turn the user purchase history changes, but item domain remains static so the item features are taken as ground truth from which the user feature, X can be derived as:

$$P = XY^T$$

$$X = P(Y^T)^{-1}$$

User feature vector, $X_u$ for each user can be computed as:

$$X_u = P_u (Y^T)^{-1}$$

Binarized purchase matrix, $P_u$ and hence user feature vector, $X_u$ are computed at runtime and will vary as user profile varies. The scores for each item can be computed by the item:

$$R' = X_u Y^T$$

The model representation is modified to store the item feature matrix, Y and the pseudo-inverse of the item feature matrix, $(Y^T)^-$ instead of the standard user features, X and item features, Y.

Another approach is to normalize the frequencies to handle implicit frequency data. Normalization is achieved by using item and user multipliers. Implicit ALS models predict item affinities and not frequencies. These predicted item affinities and the frequency values are used to compute a multiplier constant for each user and item so that:

$$P_{u,i} = R_{u,i} \alpha_u \beta_i$$

Figure 7:
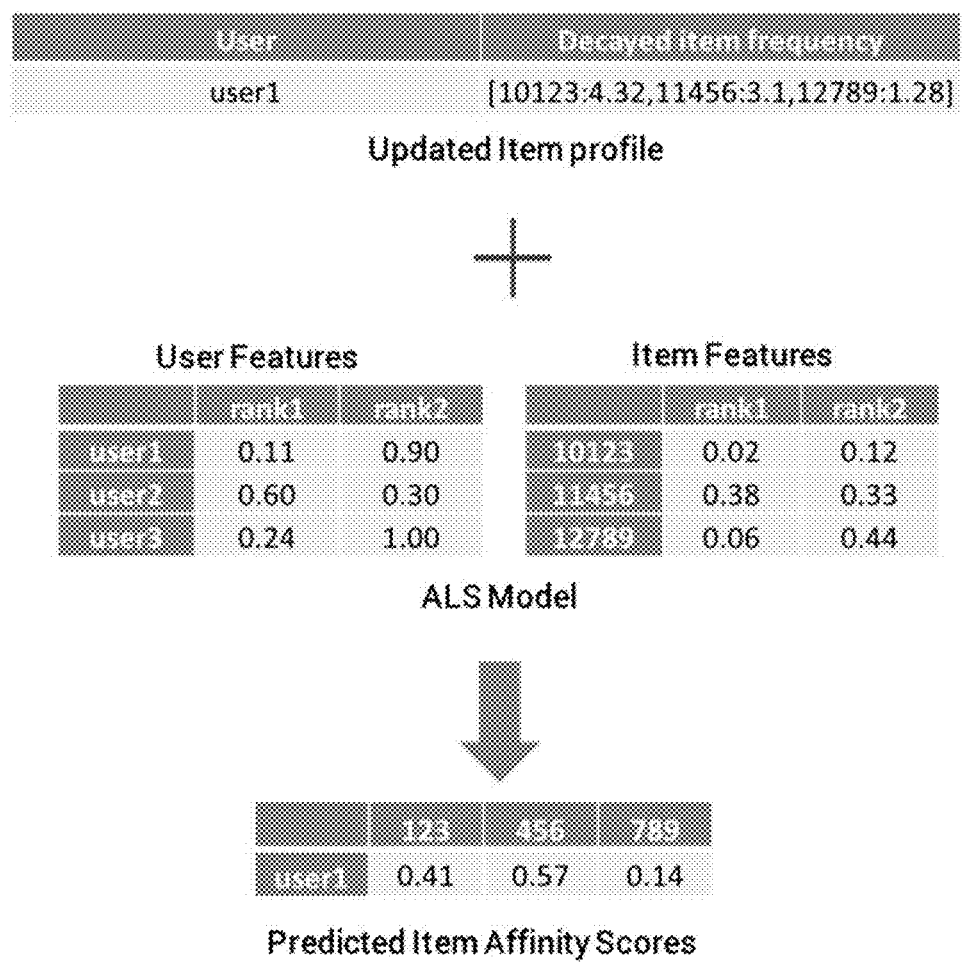
FIG. 7 shows an example of ALS model scoring.

The user multiplier, $\alpha_u$ and item multiplier, $\beta_i$ are used to normalize profile frequencies to purchase affinities while scoring. Next collaborative filtering is used on these purchase affinities to impute the purchase affinities for items which the user has not interacted within the past. An example of ALS model scoring is shown in FIG. 7.

The system implements topic models including a collaborative profiling algorithm described in Patent Publication No. PCT/US2015/065101, which is incorporated by reference herein for all purposes, which uses Latent Dirichlet allocation (LDA) model. Topic models are probabilistic latent variable models of documents that exploit the correlations among the items purchased and latent user purchase themes. Topics are the hidden, to be estimated, variable relations (distributions) that link items in an inventory to their occurrence in user transaction baskets. A user transaction basket is seen as a mixture of topics. The generation of user transaction baskets is modeled as a stochastic process which is then reversed by machine learning techniques to return estimates of the latent variables. Topic models are effective for long tailed (i.e. those occurring with low frequency) offers which account for user's individual tastes by describing user activity with a set of topics. When the model is built, essentially what is left is a matrix of items (akin to words) by archetypes (akin to topics) gleaned from users' purchase histories (akin to documents).

LDA's generative model posits that the characteristics of archetypes and user transaction baskets are drawn from Dirichlet distributions. The Dirichlet distribution's probability density function is defined as:

$$p(x|\alpha_1, \ldots, \alpha_K) = \frac{\Gamma\left(\sum_{i=1}^{K} \alpha_i\right)}{\prod_{i=1}^{K} \Gamma(\alpha_i)} \prod_{i=1}^{K} x_i^{\alpha_i - 1}$$

Where k is the number of archetypes, $\alpha$ is a positive vector of size K, and $\Gamma$ denotes the Gamma function.

LDA's generative model decides which items are likely for each archetype based on the Dirichlet parameter, $\beta$. It also decides the proportion of archetypes to describe each user's purchase history using the Dirichlet parameter, $\alpha$. Using these distributions, the model generates a user's purchase history, item by item, where it chooses an archetype for each item and then chooses the likely item given this archetype. This generative process is described by the following joint distribution:

$$p(w, z, \theta | \alpha, \beta) = p(\theta | \alpha) \cdot p(z | \theta) \cdot p(\varphi | \beta) \cdot p(w | z, \varphi)$$

where,
w is the set of user transaction baskets,
z is the archetype index
$\theta$ is the archetype distribution per user purchase basket.
$\alpha$ is a Dirichlet parameter, a positive vector of size K
$\varphi$ is the item distribution per archetype.
$\beta$ is a Dirichlet parameter, a positive vector of size v
v is the number of items in the item hierarchy The first factor of the joint distribution is the archetype distribution per user transaction basket, $\theta$ which is drawn from the Dirichlet distribution, given the Dirichlet parameter $\alpha$. The second factor is the distribution of the archetypes to item assignments in the user purchase baskets, z, which depends on the distribution $\theta$. Each item $w_i$ in a user transaction basket of N items is therefore assigned a value from 1 to the number of specified archetypes, K. The third component is the item distributions per archetype $\varphi$ are also drawn from a Dirichlet distribution with parameter $\beta$. The last component is the probability of the set of user transaction baskets w given the archetype indices z and the item distribution per archetype, φ.

The latent variables are marginalized to express the model's probability when the user transaction baskets, w and the hyper-parameters α and β are given.

$$p(w|\alpha,\beta) = \int_\varphi \int_\theta \sum_z \left( \prod_{d=1}^{D} \frac{\Gamma(\alpha)}{\prod_{k=1}^{K} \Gamma(\alpha_k)} \prod_{k=1}^{K} \theta_{d,k}^{\alpha_k + n_{d,k} - 1} \right) \cdot \left( \prod_{k=1}^{K} \frac{\Gamma(\beta_k)}{\prod_{k=1}^{V} \Gamma(\beta_{k,v})} \prod_{v=1}^{V} \varphi_{k,v}^{\beta_{k,v} + n_{k,v} - 1} \right) d\theta d\varphi$$

where,

D is a user transaction basket, $n_{d,k}$ is the number of times user transaction basket has been assigned to archetype k, $n_{k,v}$ is the number of times the archetype k is assigned to a item v.

The Collapsed Variational Bayesian inference algorithm is used to infer the latent variables of the archetype model. Given the observed user transaction baskets w the algorithm computes the item probabilities across the user transaction baskets, P, the archetype posterior probabilities, θ and the archetype item matrix φ.

TABLE 2

Item probability across the user transaction baskets, P

| item1 | item2 | item3 | item4 | item5 |
|-------|-------|-------|-------|-------|
| 0.32  | 0.15  | 0.16  | 0.11  | 0.26  |

TABLE 3

Example of archetype distributions across three user transaction baskets, θ

|       | archetype1 | archetype2 | archetype3 | archetype4 |
|-------|------------|------------|------------|------------|
| user1 | 0.5        | 0.1        | 0.3        | 0.1        |
| user2 | 0          | 0.9        | 0.1        | 0          |
| user3 | 0.02       | 0.48       | 0.25       | 0.25       |

TABLE 4

Example of item distributions across four archetypes, φ.

|            | item1 | item2 | item3 | item4 | item5 |
|------------|-------|-------|-------|-------|-------|
| archetype1 | 0.1   | 0.1   | 0     | 0.7   | 0.1   |
| archetype2 | 0.2   | 0.1   | 0.2   | 0.2   | 0.3   |
| archetype3 | 0.01  | 0.2   | 0.39  | 0.3   | 0.1   |
| archetype4 | 0     | 0     | 0.5   | 0.3   | 0.2   |

Figure 8:
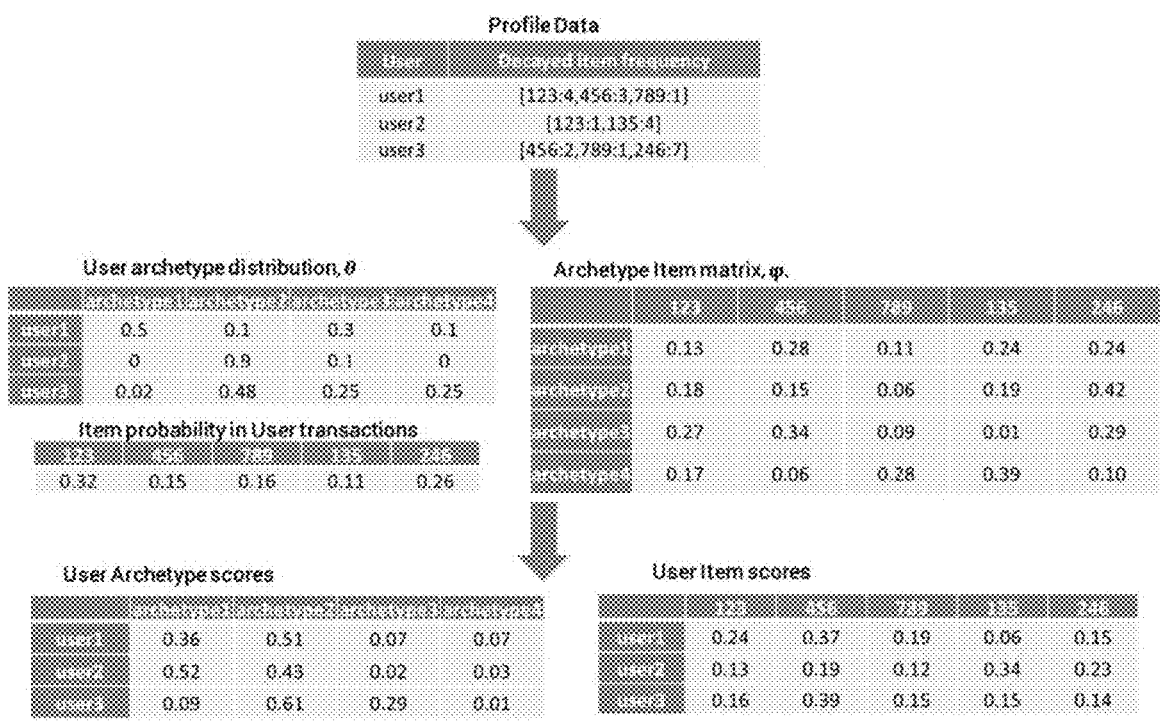
FIG. 8 shows an example of collaborative profiling model training and scoring.

For computing the archetype scores for each user the topic probabilities vector is initialized as $\theta_0$. For each archetype the probability of the users transaction basket being generated from that archetype is computed using a seed Dirichlet parameter α and the archetype item matrix, φ. It is assumed that the generation of each item is independent variable. This process is repeated till convergence and the change in archetype probabilities is less than a threshold, ε. The archetype probabilities are normalized, such that the sum of all assigned probabilities is 1. The item scores are computed by multiplying the archetype scores with the archetype item matrix, φ. The item probabilities are normalized, such that the sum of all assigned probabilities is 1. An example of LDA training and scoring is shown in FIG. 8.

The system implements neighborhood based techniques including item and/or user similarity based collaborative filtering. These techniques are effective for static or slowly changing item hierarchies. The item based collaborative filtering approach is scalable and uses historical user activity to find items that share similar user activity. Online scoring generates the user preferences for all or a subset of all items based on their interaction with similar items in their historical activity.

The user purchase matrix, R is created as a sparse matrix based on the user profile data, where each entry $r_{ui}$ is the quantity of purchase of item i by user u. Based on the purchase matrix, R, item similarity, I and user similarity, U matrices are computed. The similarities are based on the pair-wise Cosine distance between the item purchase vectors or the user purchase vectors. Similarity between two items $i_1$ and $i_2$, $I_{12}$ is derived as the dot product between the two vectors:

$$i_{12} = i_1 \cdot i_2$$

Figure 9:
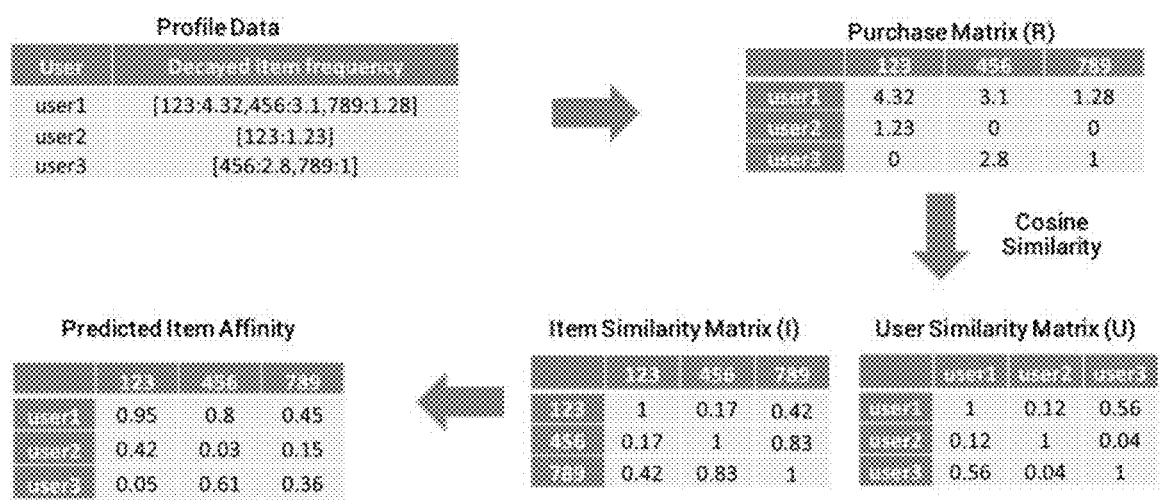
FIG. 9 illustrates a collaborative filtering model which generates a mapping of each item to its top "k" similar items and their similarities.

The model is represented as a mapping of each item to its top "k" similar items and their similarities as shown in FIG. 9. Other metrics can also be used to define the similarity between the items or users. The similarity computation can be based on additional item and user attributes and even latent features which represent the item and user attributes. Using the item similarity matrix the user purchase affinities, R' are computed as the multiplication of the purchase matrix, R and the item similarity, I, where the predicted ratings are replaced by known purchase ratings $$R' = (1-P) \circ R \cdot I + P \circ R$$

Where P is the binarized purchase matrix.

Likewise the purchase affinities can be computed using the user similarity matrix.

$$R' = (1-P) \circ U \cdot R + P \circ R$$

The item similarity (I) and user similarity (U) matrices can be put together to compute the purchase affinities, R'

$$R' = (1-P) \circ U \cdot R \cdot I + P \circ R$$

Scoring

The scoring system takes the updated profile and the models as inputs and it outputs item purchase propensity scores i.e. item affinities for the user. The scoring process is online and generates the affinities in real time. Each model indicates the user's propensity to purchase any item in the inventory.

Figure 10:
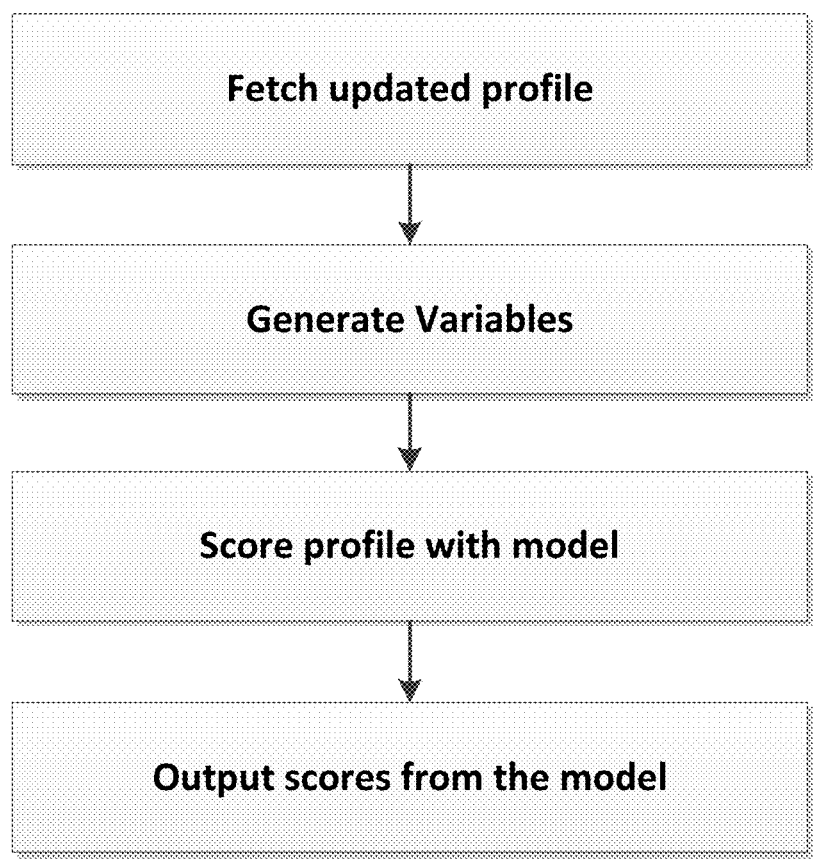
FIG. 10 is a flowchart illustrating a method of scoring.

Various steps involved in scoring are outlined in FIG. 10, which is a flowchart illustrating a method 1000 of scoring. At 1002, an updated is fetched by a computer processor. At 1004, the computer processor generates one or more variables, and at 1006 scores the profile with a model, according to the one or more variables. At 1008, the computer processor outputs one or more scores from the model.

The scoring process aligns with the modeling process and the same variables required for the model are also generated in real time. The updated profile and variables are scored with the current instance of the model.

The generated models are used to predict item affinities, whether in a repurchase offer scenario or a cross-sell offer scenario. To compute the item affinities for all items would require time proportional to the total number of items which could range from a few thousand to a few million. To reduce this time complexity our solution uses a concept of item scoring domain which is a candidate set of items which the user is likely to have a high propensity for. Our system uses item similarity to define the item scoring domain, which is the set of items which have already been bought by the user as well as those which are similar to these already bought items. The similarity is defined using either k-nearest neighbors (KNN) or locality sensitive hashing (LSH) model. KNN identifies the top k nearest neighbors for an item based on pairwise item similarity metrics like Cosine similarity, Euclidean distance, etc. This process is made more efficient by using techniques like LSH which eliminate the need to perform a pair-wise search across all items. LSH is a technique for grouping items into 'buckets' based on the distance metric. Items that are similar to each other under the chosen metric are mapped to the same bucket with high probability. After mapping each item to its respective hash bucket, approximate nearest neighbors are computed by examining only the items in the bucket. To achieve a good trade-off between efficiency and quality, the hashing procedure is repeated multiple times, and then the outputs are combined.

TABLE 5 shows an example of a row of propensity scores for a user. The higher the score the higher is the propensity of purchase.

TABLE 5

Example of Item Propensity Scores

| User ID | Propensity (bread) | Propensity (milk) | Propensity (eggs) | Propensity (water) | Propensity (beer) |
|---|---|---|---|---|---|
| 1234 | 86 | 73 | 9 | 72 | 15 |

In this example, the propensity values are arbitrarily scaled between 0 and 100, although other scales may be used (e.g. the z-scale). Regardless of scaling, the offer assignment is guided directly by the relative ranking of item affinities/propensities. The user is quite likely to buy milk, bread, and water. By giving him/her offers for these items will encourage repurchases of these items in future. So in this example, solving repurchase offer problem would imply recommending offers for milk, bread, and water.

On the other hand, the user does not show high propensity for eggs and beer. He/she is unlikely to purchase these items in near future. However there may exist items that this user either buys but infrequently (sometimes referred to as "rare" items), or users similar to this user buy regularly but not this user. The cross-sell predictive model constructs a set of such aligned but rarely bought items for the user and those items are then offered to the user with the objective of promoting cross-sales.

As mentioned earlier, the predictive models create an array of user item affinities in real time and make it available to the downstream business constraints step in which the best item offer(s) for each user can be selected, subject to business constraints such as number and depth of offers available, user or item suppressions, maximum number of offers to be given to a user or group of users, etc.

Schema

Figure 11:
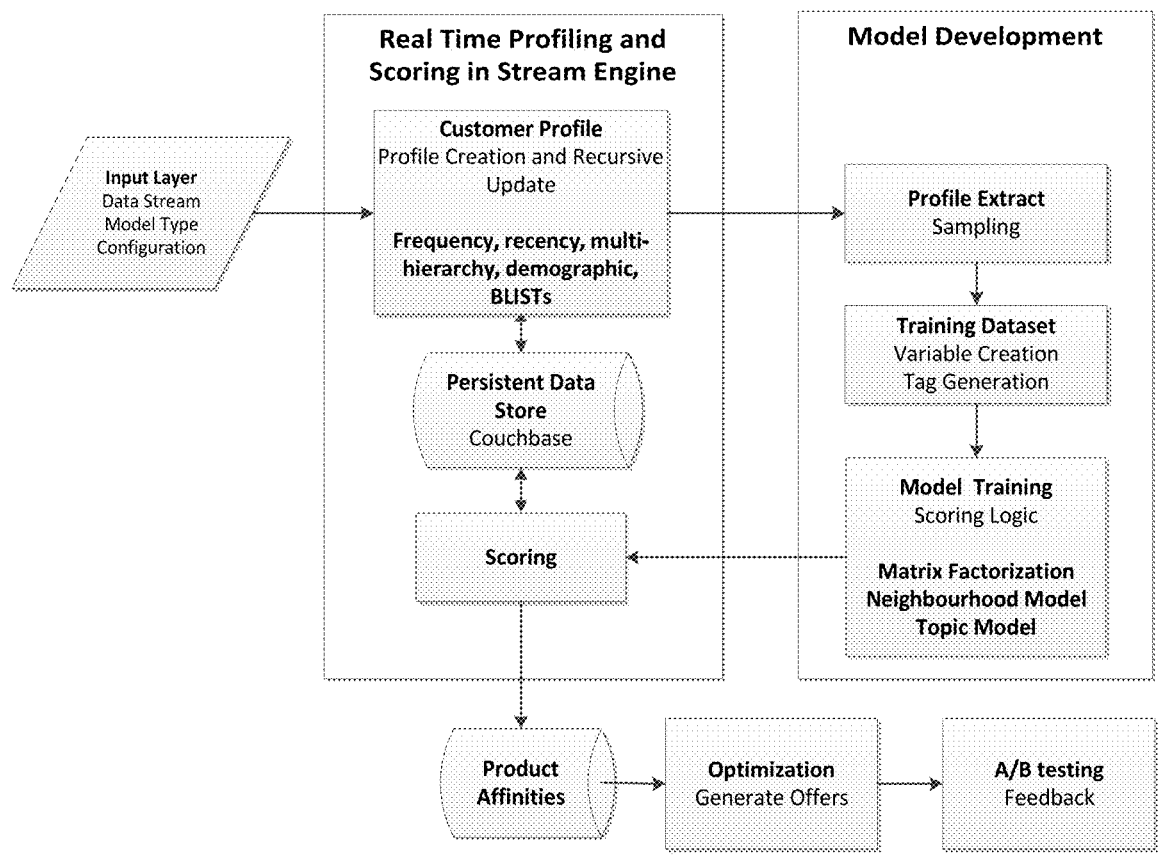
FIG. 11 depicts the overall architecture of the solution with the profile update, scoring and model training components.

FIG. 11 shows an overall schematic of the system. The system represents the major components of real time profiling and scoring, which uses a NoSQL database like Couchbase®. The profiling and scoring component takes an input stream of data along with model types and configuration parameters. The input data is parsed is cleaned and parsed into the format required by the profiling step. The profiling step takes input data and updates the existing customer profile in the profile store database like Couchbase®. The updated profile is then passed to the scoring step which scores the profile based on the suite of models to output a set of product propensity scores. These scores can then be passed through a real time optimization system to generate recommendations. There is also a model development component which extracts the profiles from the profile store and generates training datasets. The models are trained based on the training dataset and then plugged back into the scoring step.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product storing instructions that, when executed by at least one programmable processor, cause the at least one programmable processor to perform operations comprising:
   generate a profile of a user, the profile being a summarized representation of historical behavior of the user, the profile comprising profile variables for the user, the variables including information about the ratio associated with the purchase of an item over a time period;
   recursively update the profile variables for the user based on a new transaction in a series of transactions, the profile variables representing the user's incremental transaction history over the time period concisely to avoid overhead associated with storing large volumes of transaction history for the user's profile, the profile of the user being based on one or more variables associated with transactions by the user, the recursively updated profile variables for the user representing a transaction history using transaction velocities, averages, and ratios associated with the transactions by the user;
   generate a propensity score for the user based on the updated profile variables and an item scoring domain comprising a candidate set of items for which the user is likely to have a high propensity; and
   for the new transaction, generate one or more offers for the user based on the updated user profile variables and the propensity score.

2. The computer program product in accordance with claim 1, wherein the user's propensity for an item is determined based on an item propensity score generated for the user at one or more time intervals based on the user's updated profile variables.

3. The computer program product in accordance with claim 1, wherein the profile of the user further includes user demographic data and the one or more variables comprise one or more of: a frequency of purchase of an SKU by the user, a time elapsed since the user's last purchase, a quantity purchased, and/or a price paid by the user.

4. The computer program product in accordance with claim 1, wherein a first variable is updated based on information related to a transaction associated with the purchase of the item at a first point in time without reference to historical information about purchases of the item during a time prior to the first point in time.

5. The computer program product in accordance with claim 4, wherein the first variable is weighted average of transaction characteristics that get updated with each transaction recursively.

6. A system comprising:
   at least one programmable processor; and
   a machine-readable medium storing instructions that, when executed by the at least one processor, cause the at least one programmable processor to perform operations comprising:
   generating a profile of a user, the profile being a summarized representation of historical behavior of the user, the profile comprising profile variables for the user, the variables including information about the ratio associated with the purchase of an item over a time period;
   recursively update the profile variables for the user based on a new transaction in a series of transactions, the profile variables representing the user's incremental transaction history over the time period concisely to avoid overhead associated with storing large volumes of transaction history for the user's profile, the profile of the user being based on one or more variables associated with transactions by the user, the recursively updated profile variables for the user representing a transaction history using transaction velocities, averages, and ratios associated with the transactions by the user;
   generating a propensity score for the user based on the updated profile variables and an item scoring domain comprising a candidate set of items for which the user is likely to have a high propensity; and
   for the new transaction, generating one or more offers for the user based on the updated user profile variables and the propensity score.

7. The system in accordance with claim 1, wherein the user's propensity for an item is determined based on an item propensity score generated for the user at one or more time intervals based on the user's updated profile variables.

8. The system in accordance with claim 6, wherein the one or more variables comprise one or more of: a frequency of purchase of an SKU by the user, a time elapsed since the user's last purchase, a quantity purchased, and/or a price paid by the user.

9. The system in accordance with claim 6, wherein the profile of the user further includes user demographic data.

10. The system in accordance with claim 6, wherein the operations further comprise delivering the one or more offers to a computing device associated with the user via a communication network.

11. The system in accordance with claim 10, wherein the one or more offers include a discount on a product associated with the purchase transaction data associated with the user.

\* \* \* \* \*